Feb. 2, 1954
R. A. F. SANDBERG ET AL
2,668,219
ARTICLE FEEDING APPARATUS
Filed Jan. 19, 1949
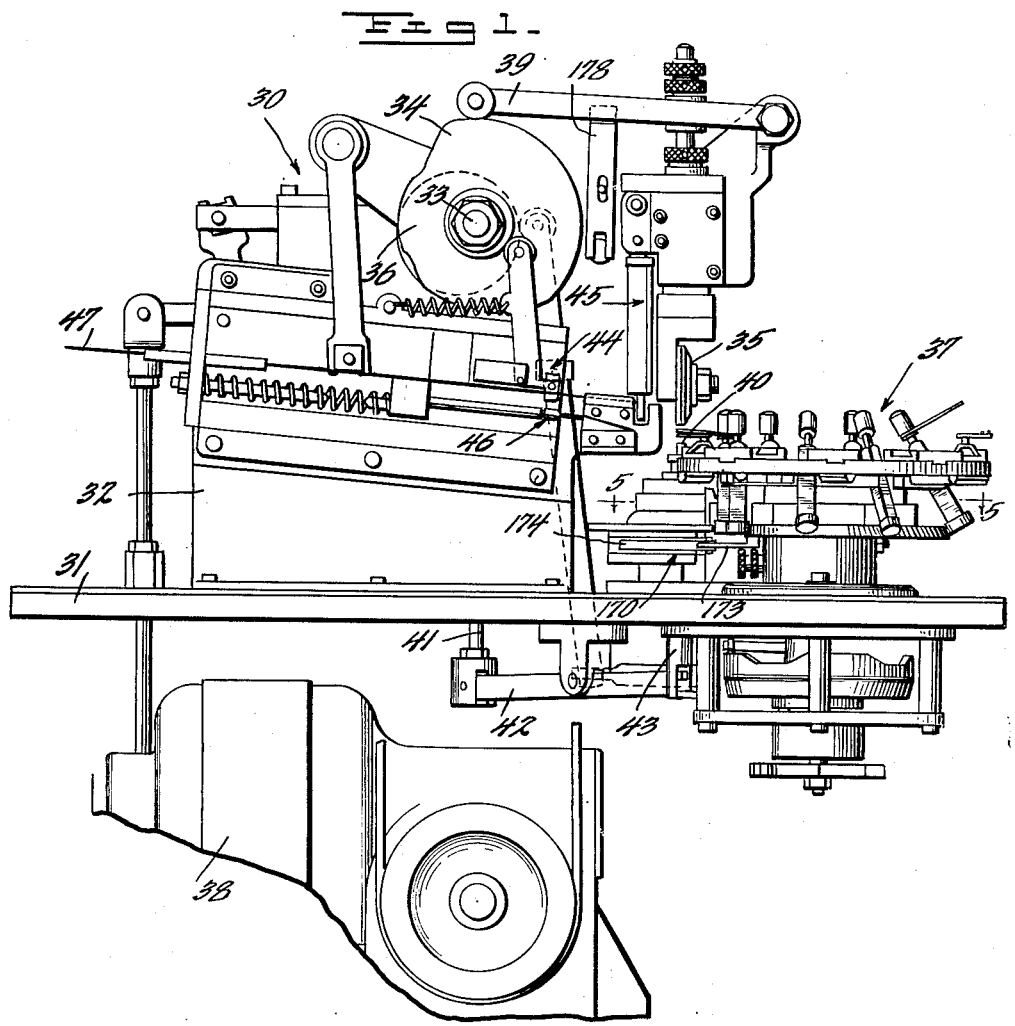
Inventors
ROLF A. F. SANDBERG
FRANK G. WIKSTROM
By
C. B. Hamilton
ATTORNEY

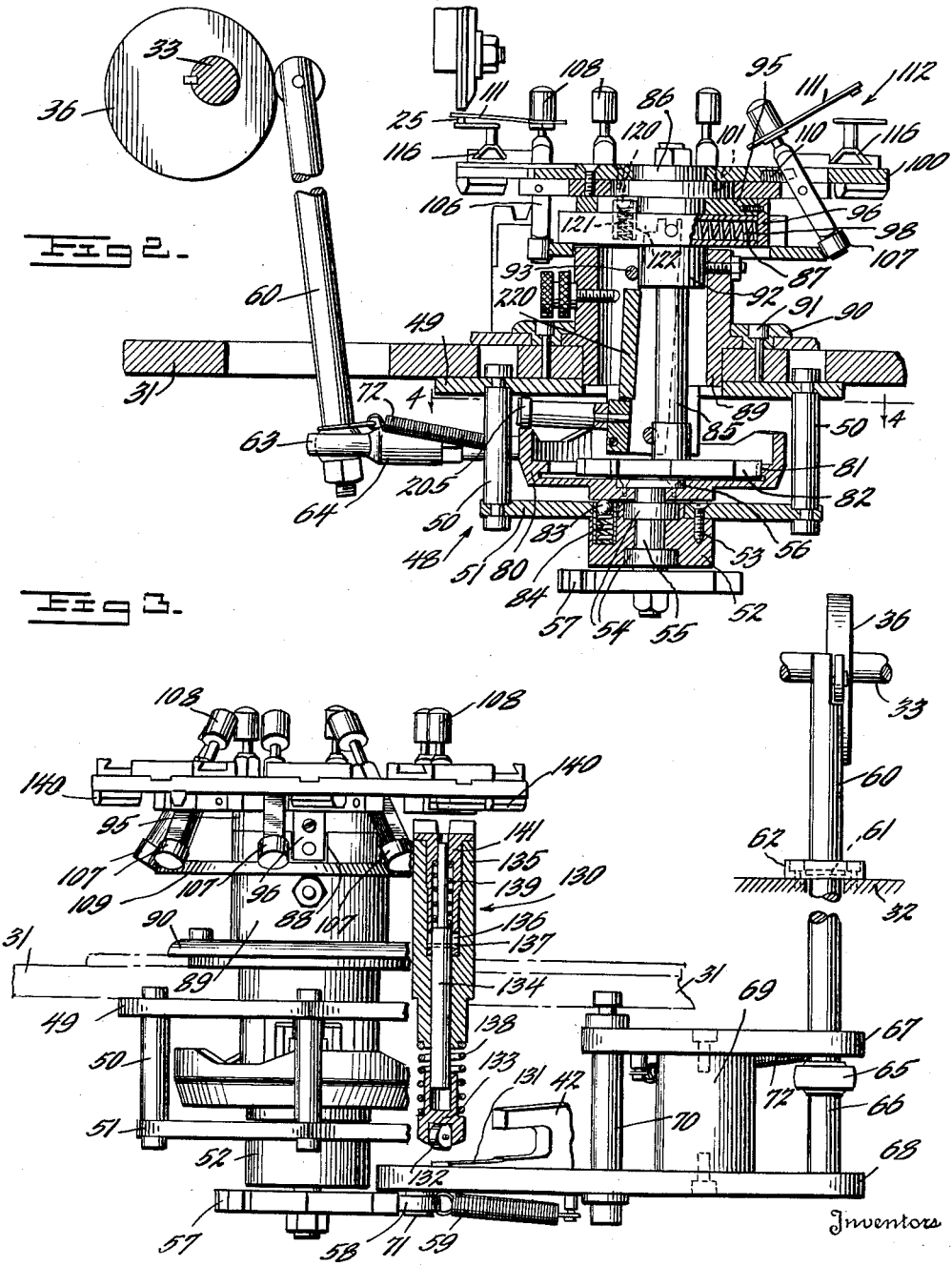

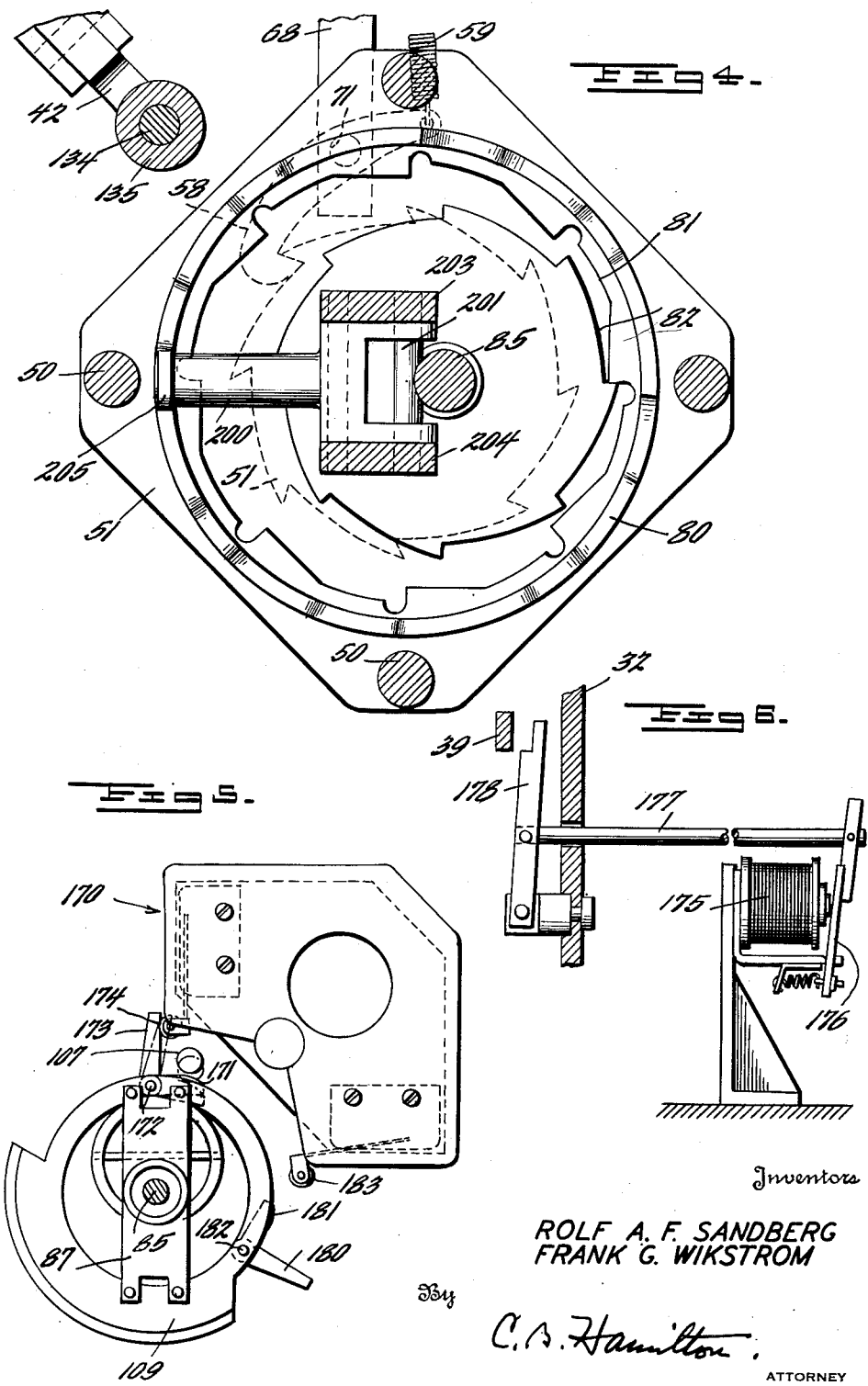

Feb. 2, 1954  R. A. F. SANDBERG ET AL  2,668,219
ARTICLE FEEDING APPARATUS
Filed Jan. 19, 1949  6 Sheets-Sheet 4
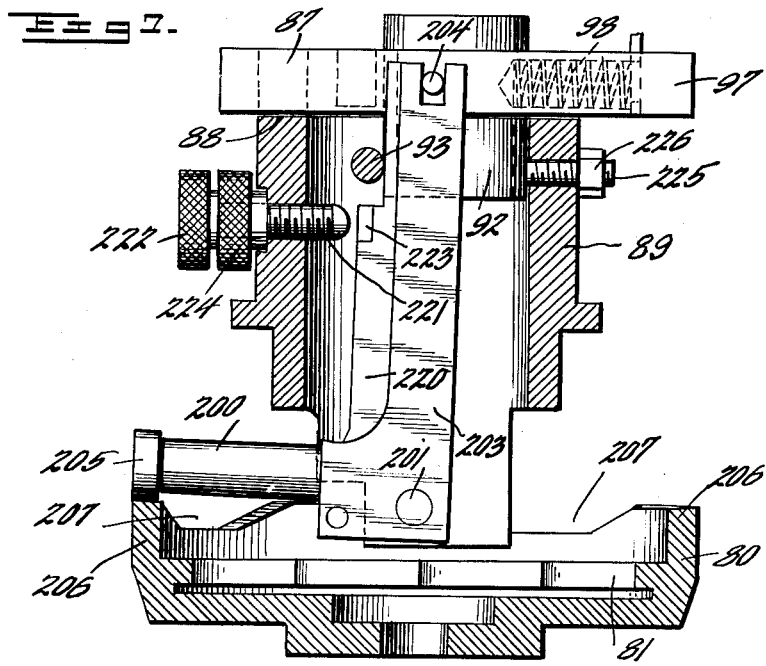
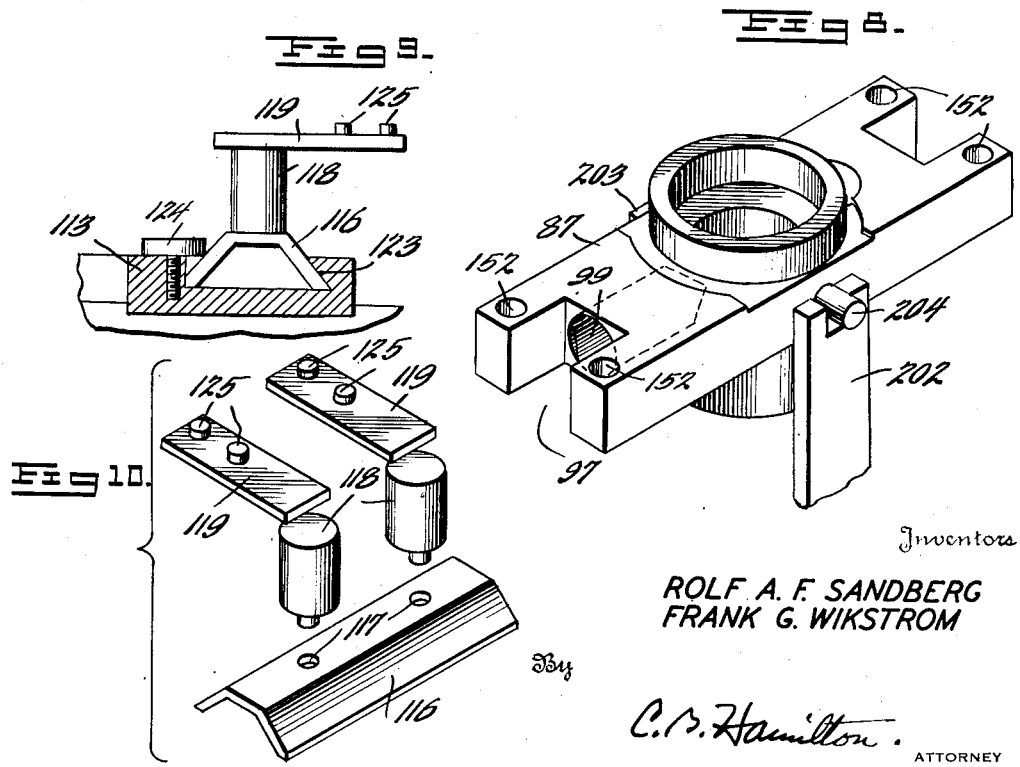
Inventors
ROLF A. F. SANDBERG
FRANK G. WIKSTROM
By
C. B. Hamilton
ATTORNEY Feb. 2, 1954 R. A. F. SANDBERG ET AL 2,668,219
ARTICLE FEEDING APPARATUS
Filed Jan. 19, 1949 6 Sheets-Sheet 5
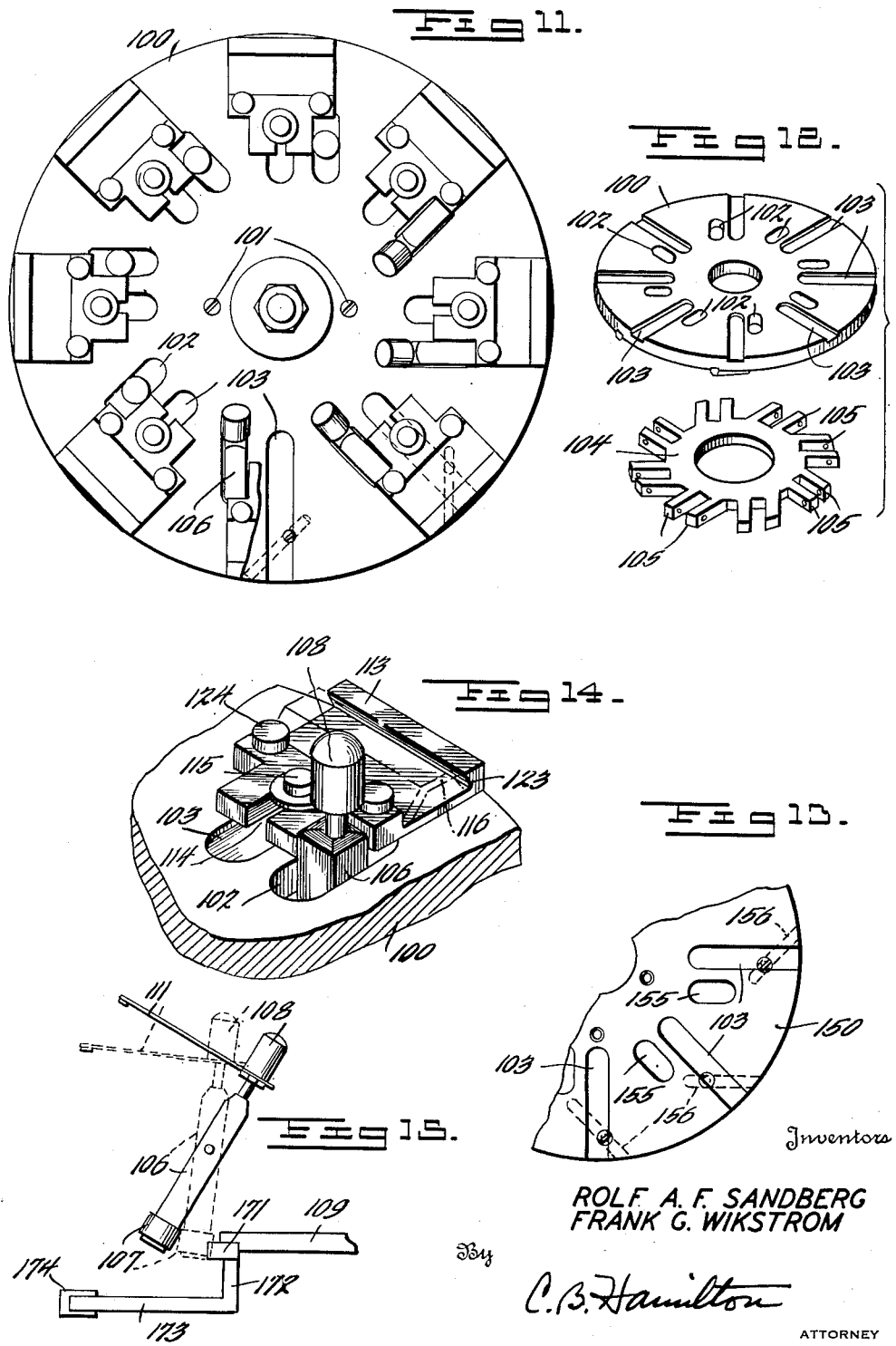
Inventors
ROLF A. F. SANDBERG
FRANK G. WIKSTROM
By
C. B. Hamilton
ATTORNEY

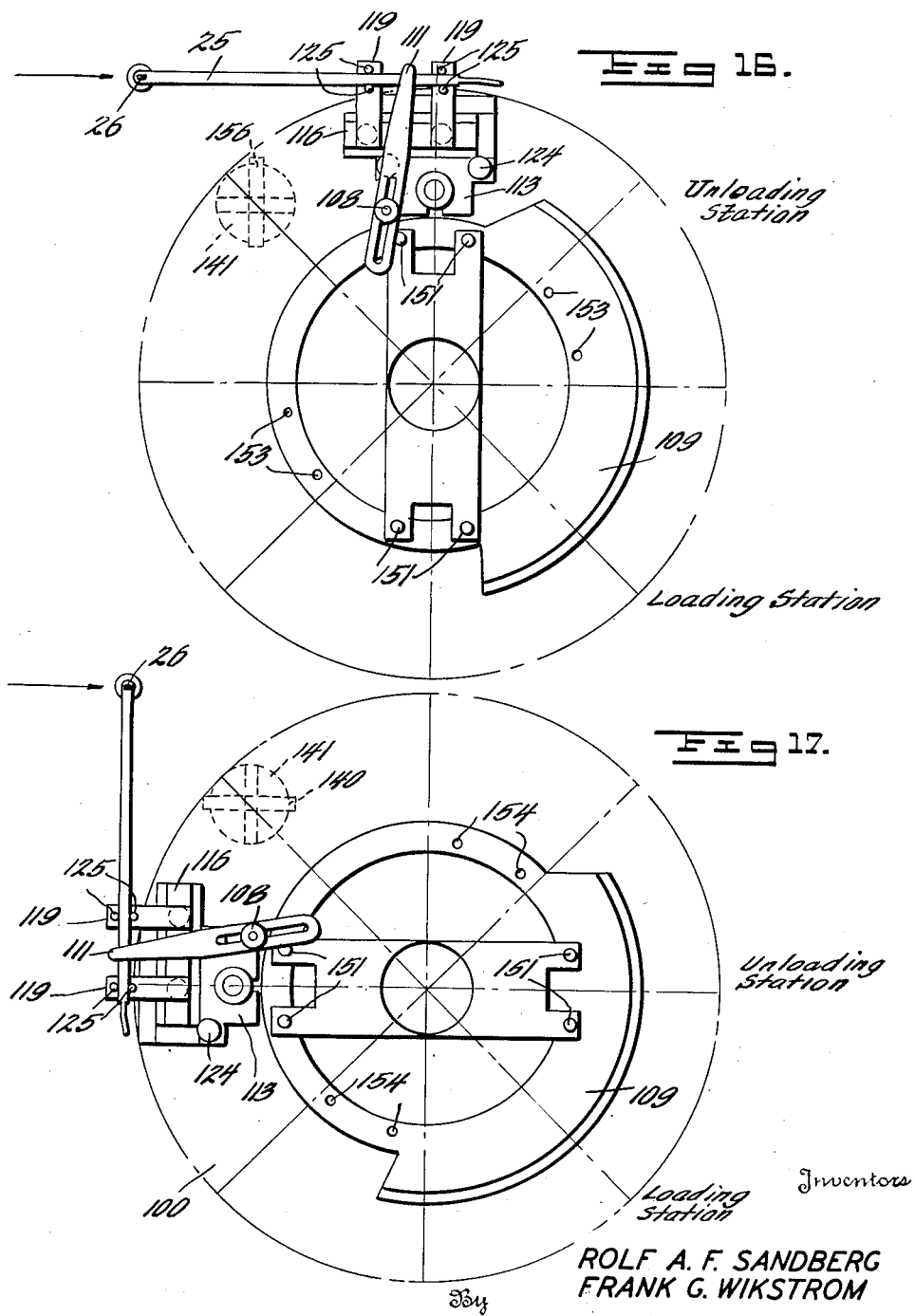

Patented Feb. 2, 1954

2,668,219

UNITED STATES PATENT OFFICE 2,668,219

ARTICLE FEEDING APPARATUS

Rolf A. F. Sandberg, Queens Village, and Frank G. Wikstrom, Valley Stream, N. Y., assignors to Western Electric Company, Incorporated, New York, N. Y., a corporation of New York Application January 19, 1949, Serial No. 71,682

16 Claims. (Cl. 219—4)

This invention pertains to an article feeding apparatus and more particularly to apparatus for feeding parts in a step by step movement to a welding or other processing machine.

In the manufacture of contact members for use in various electrical equipment, welding machines such as disclosed in the patents to C. L. Pfeiffer No. 2,024,597 dated December 17, 1935, T. M. King No. 2,129,845 dated September 13, 1938, and in a copending application of Frank G. Wikstrom, Serial No. 32,641 filed June 12, 1948, now Patent No. 2,537,385, dated January 9, 1951, are utilized to weld contact elements made of gold, silver, palladium or other expensive metals to relatively inexpensive metallic elements in the form of leaf springs. Heretofore, it has been the custom to use a stationary fixture to hold the leaf spring while a contact element was welded thereto; thus the manufacture of the contact members was a relatively slow and costly operation.

It is the purpose of this invention to provide a mechanism for automatically feeding the contact leaf springs to the welding machine in a rapid and accurate manner.

An additional object of the invention is to provide a simple feeding mechanism whereby parts may be fed to a processing machine, worked upon, and then shifted so that a second work operation may be performed on a different portion of the same part.

A further object of this invention is to provide a feeding mechanism that can be selectively utilized to feed parts to the processing machine in a variety of movements.

A still further object of the present invention is the provision of a safety device for the apparatus wherein the processing machine is prevented from performing a work operation whenever a part to be worked upon is not properly positioned in the feeding mechanism.

In accordance with one embodiment of the invention, an apparatus is provided for feeding contact leaf springs between a pair of welding electrodes where short lengths of contact material are welded to the leaf springs. The feeding apparatus is actuated by a cam secured to a rotating main cam shaft of the welding machine whereby synchronous operation of the feeding apparatus and the welding machine is obtained. The feeding apparatus includes an indexing turntable which is driven through a pawl and ratchet mechanism from the cam on the main cam shaft. A plurality of equally spaced adjustable work supports are mounted on the turntable each of which has cooperating therewith a pivoted arm which holds a contact leaf spring against the work support as the turntable is indexed into the welding position. The turntable is mounted on a slide which can be selectively positioned so that two welding operations may be performed on different portions of the same contact leaf springs. In addition, a safety device is provided to arrest the movement of one of the welding electrodes to interrupt the welding operation whenever a work holder arrives at the welding position without a contact leaf spring.

Other features and advantages of the invention will become apparent from the following detailed description taken in conjunction with the accompanying drawings, in which Fig. 1 is a fragmentary front elevational view of a welding machine and a feeding apparatus embodying the features of the invention;

Fig. 2 is an enlarged detailed sectional view of the feeding apparatus shown in Fig. 1;

Fig. 3 is an enlarged side elevational view of the feeding apparatus disclosed in Figs. 1 and 2 with the details of the turntable locking means shown in section;

Fig. 4 is an enlarged cross-sectional view of the details of the barrel cam and the pawl and ratchet mechanism taken on line 4—4 of Fig. 2 looking in the direction indicated by the arrows;

Fig. 5 is an enlarged cross-sectional view taken on line 5—5 of Fig. 1 showing the details of the safety device;

Fig. 6 is an enlarged side elevational view of the stop lever shown in Fig. 1 together with its actuating solenoid;

Fig. 7 is an enlarged sectional detailed view of the barrel cam of Fig. 4 together with the bell crank and slide actuated thereby;

Fig. 8 is a perspective view of the slide and a portion of the bell crank shown in Fig. 7;

Fig. 9 is an enlarged sectional view of one of the work supports shown in Fig. 2;

Fig. 10 is an exploded perspective view of the work support;

Fig. 11 is a fragmentary top plan view of the turntable shown in Fig. 2;

Fig. 12 is an exploded perspective view of the nest plate and its bearing plate;

Fig. 13 is a fragmentary view of a modified type of nesting plate;

Fig. 14 is a fragmentary perspective view of the nest plate and nest slide;

Fig. 15 is an enlarged sectional view of the operating linkage for the safety device shown in Fig. 1;

Fig. 16 is an enlarged fragmentary top plan view of the turntable showing a work holder positioning a contact leaf spring for the production of a parallel welded contact;

Fig. 17 is an enlarged fragmentary top plan view of the turntable showing a work holder positioning a contact leaf spring for the production of a crosswise welded contact; and Figs. 18, 19, 20 and 21 are enlarged views showing various types of contacts that can be produced by use of the apparatus disclosed in the present invention.

Referring to the drawings and particularly to Fig. 1, there is shown a portion of a welding machine 30 of the type shown and described in the copending applications of Frank G. Wikstrom, Serial Nos. 32,641 and 32,665 filed June 12, 1948, now Patents Nos. 2,537,385 and 2,537,386, respectively, dated January 9, 1951. As described in detail in the aforementioned copending applications, the contact welding apparatus includes a bench 31 having a housing 32 mounted thereon to which the various elemental parts of the welding machine are secured or mounted. Journalled within suitable bearings located in the side walls of the housing 32 is a main cam shaft 33 having a plurality of cams secured thereto for the purpose of operating the various component mechanisms which comprise the welding apparatus. For purposes of describing this invention and for simplifying the drawings only two cams of the many are shown, a cam 34 for operating an upper welding electrode 35 and a cam 36 for operating a contact leaf spring feeding apparatus designated generally by the reference numeral 37. A motor 38 mounted beneath the bench 31 is provided for continuously driving the cam shaft 33 upon energization or if a one revolution clutch is provided on the cam shaft 33 as shown in said copending application, Serial No. 32,641 filed June 12, 1948, the cam shaft is engaged for only a single revolution.

The upper welding electrode 35 is actuated by a pivoted lever 39 which follows the contour of the cam 34 to move the upper welding electrode into a welding position for each rotation of the cam shaft 33. A lower electrode 40 is provided to operate in conjunction with the upper welding electrode to weld a contact element 26 to a contact leaf spring 25 (Figs. 18, 19, 20 and 21) for each cycle of operation of the welding apparatus. Another cam (not shown) on the cam shaft 33 reciprocates the lower welding electrode through the instrumentality of a follower rod 41, a pivoted lever 42 and a push rod 43 in timed sequence with the operation of the remainder of the apparatus. Other cams (not shown) secured to the cam shaft 33 through suitable linkage mechanisms operate in timed sequence a contact strip feeding mechanism 44, a vertically reciprocating shearing mechanism 45 and a transfer mechanism 46. The purpose of the feeding mechanism 44 is to intermittently feed a strip of contact material 47 to the shearing mechanism 45 wherein a relatively short length of contact material 26 is sheared from the strip 47 and delivered to a position in advance of the transfer mechanism 46 which is then actuated to transfer the sheared contact element 26 to a position between the welding electrodes and onto a contact leaf spring 25 which has been previously positioned between the welding electrodes by the feeding apparatus 37.

Referring to Figs. 2 and 3, the feeding apparatus 37 embodying the present invention is shown as being mounted on the bench 31. Fixed to the underside of the bench 31 is a frame 48 for supporting the feeding apparatus which frame consists of two spaced parallel plates 49 and 51 which are interconnected by four studs 50. A bearing hub 52 is fastened to the lower mounting plate 51 by means of a plurality of machine screws 53, only one of which is shown in Fig. 2. This bearing hub 52 has a pair of radial recesses therein for receiving a pair of plain bearings 54 for supporting a rotatable shaft 55 having a flanged portion 56 at its upper terminus. Secured to the lower end of the rotatable shaft 55 is a ratchet wheel 57 adapted to be operated by a pawl 58 which is urged into engagement with the ratchet wheel 57 by a spring 59. The pawl 58 is actuated to advance the ratchet wheel by a linkage mechanism operated by the cam 36 (Figs. 1, 2 and 3). When the cam 36 is rotated, it pivots a rocker arm 60 about a pin 61 mounted in a bearing block 62 attached to the welding machine housing 32. Motion of the rocker arm 60 is transmitted through a universal joint 63 (Fig. 2) to a rod 64 and hence through a second universal joint 65 (Fig. 3) to a link shaft 66. Secured to the upper end of the link shaft is an upper pawl lever 67 and secured to the lower end of this link shaft 67 is a lower pawl lever 68. Interposed between these two pawl levers 67 and 68 and secured thereto is a spacer member 69. The left end of the upper pawl lever 67 and the mid section of the lower pawl lever 68 are secured to a pivot shaft 70 which is rotatably mounted within an aperture in the bench 31. As shown in Fig. 3 the pawl 58 is rotatably mounted on the left end of the lower pawl lever 68 by means of a stud 71 and is maintained in engagement with the ratchet wheel 57 by the spring 59. A spring 72 secured at one end to the upper pawl lever 67 and at the other end to the rocker arm 60 forces the rocker arm 60 to follow the contour of the periphery of the cam 36.

In the present disclosed embodiment of the operating linkage for the pawl and ratchet mechanism, the linkage is selected so that for each complete revolution of the cam shaft the ratchet wheel is indexed one-eighth of a revolution. However, by changing the mechanical linkage or the size of the cam 36 or the size of the ratchet wheel 57, the increment that the ratchet wheel 57 is advanced may be changed.

Secured to the flanged portion 56 of the shaft 55 (Fig. 2) is a barrel cam 80 provided with internal teeth 81 that engage a gear wheel 82. The bottom of the barrel cam 80 is provided with eight concentrically located spherical segment depressions into which a steel ball 83 is pressed by a spring 84 located within a cylindrical recess in the bearing block 52 to prevent retrograde movement of the ratchet wheel 57 during the return movement of the pawl 58. The gear wheel 82 is firmly fixed to the lower end of a shaft 85, the upper end of which has secured thereto a flanged hub 86. In order to rotatably mount the shaft 85 a plurality of ball bearings are positioned within a race in a slide 87 so as to encircle the shaft 85 passing therethrough. The slide 87 is positioned for reciprocating movement within a pair of slots 88 located in the upper section of the wall of a hub 89. The hub 89 is flanged about its midsection and the flanged portion is adapted to rest upon the edge of an aperture in the bench 31. A holding ring 90 notched to engage the flanged portion of the hub 89 is secured to the bench 31 by a plurality of bolts 91 and acts to fix the position of the hub 89 relative to the bench 31. Depending from the slide 87 and secured thereto is a collar 92 which surrounds the shaft 85 and is held against sliding movement by a removable pin 93. Thus the slide 87 secured to the collar 92 is also held against sliding movement by the pin 93 and the gear wheel 82, positioned by the slide 87, is held in engagement with the internal teeth 81 of the barrel cam 80.

Rigidly secured to the upper face of the hub 89 is a slide holding plate 95 which confines the slide 87 to operation within the slots 88. As viewed in Fig. 2 there is secured to the right hand portion of the holding plate 95 a depending member 96 which is adapted to ride within a slot 97 (Figs. 7 and 8) of the slide 87 to compress a slide spring 98 located in a cylindrical recess 99 in the slide 86. Therefore, as the spring 98 is under compression as shown in Fig. 2, it tends to shift the slide to the left. However, the slide is prevented from any movement at this time by the pin 93 bearing against the collar 92.

In Figs. 1, 2 and 3, the feeding apparatus 37 is set up to feed contact leaf springs 25 to the welding machine wherein contact elements of precious metal are welded thereto in what may be termed a crosswise weld; that is, the contact elements are welded to the leaf springs with their longitudinal axes at right angles to the longitudinal axes of the contact leaf springs (Fig. 17). To secure this type of weld, a nest plate 100 such as shown in Figs. 11, 12 and 17 is secured to the flanged hub 86 of the shaft 85 by any suitable quick detachable means such as a pair of machine screws 101 (Fig. 2). The nest plate 100 has a plurality of radial slots 102 and 103 therein, half of which extend to the periphery of the plate. Secured to the underside of the nest plate 100 is a circular bearing plate 104 having a plurality of pairs of mated projections 105 (Fig. 12) which are positioned with respect to the slots 102 in the nest plate 100 so that the space between each of the mated projections is in line with a slot 102.

Between each of the projections 105 there is pivotally mounted a lever 106 (Figs. 2 and 3) which is adapted to pass through the radial slots 102. To the lower end of each of these levers 106 there is rotatably mounted a cam follower roller 107 which follows a cam 109 secured to the slide 87 due to the action of a spring 110 (Fig. 2) positioned within a cylindrical recess in the radial slot 102. Detachably secured to the upper end of each of the levers 106 by means of a nut 108 is a holding arm 111 for the purpose of engaging and holding a contact leaf spring 25 on a work holder 112. These work holders 112 are best shown in Figs. 9, 10 and 14 and consist of a nest slide 113 having a slot 114 located in its rear portion which is aligned with the radial slots 103 in order that a bolt 115 may be passed through the two slots to firmly secure the nest slide 113 to the nest plate 100. When this bolt 115 is loosened, the nest slide 113 may be adjusted radially of the nest plate 100 to compensate for various types of work pieces. The nest slide 113 has a groove 123 running transversely of the radial axis of the nest plate 100 to accommodate an angle iron support 116 having two apertures 117 (Fig. 10) in its upper surface. The angle iron support 116 is held in place within the groove 123 by a pair of screws 124 having rubber heads which bear against the supports 116. By loosening the screws 124 the angle iron support may be moved along the groove 123 to various preselected positions so as to adjust the position at which the contact leaf spring 25 is held in respect to the nest plate 100. Into each of the apertures 117 there is securely fitted a stud 118 having a work rest 119 secured thereto. Upon the upper surface of each of the work rests 119, there is mounted two aligning pins 125 for the purpose of accurately holding the contact leaf spring in position. The leaf springs 25 are loaded on the work rests 119 at the loading station (Fig. 17) so that the shanks of the leaf springs overhang the work rests 119 in the manner illustrated in Fig. 17.

In operation of the apparatus, as the nest plate 100 is indexed to advance the work holders 112 toward the welding position, the roller 107 is forced to follow the contour of the cam 109 (Fig. 17) and the cam 109 is so shaped that the rollers 107 are forced inwardly to pivot the levers 106 and as a result the holding arms 111 are successively brought into engagement with the contact leaf springs 25 placed on the work rests 119. In order to further prevent any retrograde movement of the nest plate 100, during the return movement of the pawl 58, the underside of the bearing plate 104 has provided therein a plurality of equally spaced rounded recesses into which are successively pressed a hardened steel ball 120 (Fig. 2) by a spring 121 positioned within a sleeve 122 secured within an aperture in the slide 87.

In the present embodiment, the nest plate 100 is provided with eight equally spaced work holders 112 and for each actuation of the pawl and ratchet mechanism the nest plate 100 is advanced one-eighth of a revolution and a new work holder is positioned in the welding position. Upon each advance of the feeding apparatus, the force of the spring 121, tending to force the steel ball 120 into a respective recess, is overcome and the steel ball is pushed into its sleeve until the next recess is presented whereupon the steel ball 120 is again forced into the new recess. There are eight equally spaced recesses provided in both the bottom of the barrel cam 80 and the bearing plate 104 so that for each advance of the feeding mechanism new recesses are presented to be engaged by the steel balls 83 and 120.

The feeding apparatus is so constructed that with each advance of the nest plate a new leaf spring 25 is positioned for a welding operation between the upper and lower welding electrodes. When a leaf spring 25 is properly positioned for welding, it is necessary that the leaf spring 25 be held rigidly stationary during the welding operation. Referring to Fig. 3 a mechanism 130 for locking the nest plate in position during a welding operation is shown. An extension 131 of the lower electrode operating lever 42 engages a roller 132 when the lever 42 is pivoted to move the lower welding electrode 49 into the welding position. This roller 132 is rotatably mounted within a recess in a block 133 having a tapped aperture in its upper face and a rod 134 is threaded into the tapped portion. This rod 134 is mounted to reciprocate within a hub 135 which is secured within an aperture passing through the holding ring 90, the bench 31 and the plate 49. A pin 136 secured to the upper end of the rod 134 projects into a slot 137 located in the side wall of a sleeve 141 to limit the reciprocatory movement of the rod 134.

Interposed between the block 133 and the hub 135 and surrounding the rod 134 is a compression spring 138 tending to force the block 133 downwardly into engagement with the lever extension 131. The rod 134 is machined at its upper end to form a stud which projects into and positions a spring 139 within the sleeve 141. The lower coil of the spring 139 rests on a shoulder formed on the machined end of the rod 134 and the upper coil of the spring 139 engages a shoulder formed within the sleeve 141. This sleeve has its upper face notched to provide two tapered recesses (Figs. 16 and 17), crossed at right angles to each other. Secured to the under side of the nest plate 100 and adjacent to each of the work holders 112 is a locator bar 140. These locator bars 140 are set at a predetermined angle and are tapered to engage one of the tapered notches or recesses in the sleeve 141. The angle at which the locator bars 140 are set is such that the longitudinal axis of the locator bar is parallel to the slide 87 when a locator bar 140 is in position to be engaged by the notched sleeve 141.

In operation of the locking mechanism 130, the extension 131 of the lever 42 engages roller 132 and the notched sleeve 141 is moved upwardly so that one of the notches engages one of the locator bars 140 to hold the nest plate 100 stationary during a welding operation. The springs 138 and 139 are interposed between the parts for the purpose of absorbing the shock of the engagement of the various parts. Also when the notched sleeve 141 is firmly engaged with one of the locator bars 140, further movement of the notched sleeve is prevented by having further movement of the rod 134 taken up by the compression of the spring 139.

In many types of electrical equipment, it becomes necessary that a contact be provided wherein the contact element is welded to the contact leaf spring 25 in a direction parallel to the axis of the contact leaf spring (Figs. 18 and 20). The present apparatus is readily adaptable to the production of such contacts which may be termed parallel welded contacts and all that is required to place the present apparatus in condition for the production of such contacts is a few relatively simple changes and adjustments. The machine screws 101 are removed and the nest plate 100 is taken off and replaced by the nest plate 150 shown in Fig. 13. The cam 109 is disconnected from the slide 87 by removing four machine screws 151 (Figs. 16 and 17) which pass through apertures 152 (Fig. 8) located in slide 87 to engage tapped holes 153 in the cam 109. The cam 109 is then rotated approximately 60° in a clockwise direction to bring a second group of four tapped holes 154 in cam 109 in alignment with the apertures 152 in the slide 87. The screws 151 are then screwed into the tapped holes 153 to secure the cam 109 to the slide 87 in the new position. The bolts 91 are loosened and the hub 89 together with the slide 87 and the nest plate 150 are rotated 90° in a clockwise direction and then the bolts are retightened to hold the parts in the new position. The nest plate 150 has a plurality of short slots 155 (Fig. 13) identical with the slots 102 in the nest plate 100 except that they are located on the opposite side of the slots 103. Again as previously described, the levels 106 operate through the slots 155 to move the holding arms 111 into engagement with the contact leaf springs 25. The contact leaf springs 25 are placed on the work rests 119 at the loading station with their shanks overhanging the work rests in the manner illustrated in Fig. 16. To the underside of the nest plate 150 there is secured adjacent to each work holder 112 a locator bar 156 identical in shape with the locator bars 140, however, these locator bars 156 are positioned 90° out of phase with the locator bars 140. Thus a locator bar 156 is engaged by the cross notch in the sleeve 141 when a locator bar 156 is parallel to the slide 87 and in the position shown in Fig. 16.

As often occurs in the operation of automatic processing machines employing feeding apparatus that must be manually loaded, the operator fails to properly load a work holder in the feeding apparatus and as a result the processing machine or the work holder is damaged during a subsequent operation of the machine on an improperly loaded work holder. In the present invention a safety device 170 (Fig. 1) is provided whereby the welding circuit is interrupted upon arrival at the welding position of a work holder 112 without a contact leaf spring.

Referring to Figs. 5, 6 and 15, a safety device 170 is provided which is controlled by the position of the roller 107. When a work holder 112 arrives at the welding position (Fig. 17) without a contact leaf spring, the holding arm 111 has nothing to bear against and as a result the spring 110 forces the holding arm 111 down in between the work rests 119 whereupon the lower portion of the lever 108 pivots inwardly to engage an arm 171 (Fig. 15) which is pivotally mounted on the underside of the cam 109 in such a manner that the arm 171 projects slightly beyond the periphery of the cam 109. The cam 109 is cut away in the vicinity of the welding electrodes to such an extent that the roller 107 does not normally follow the cam when the work holder 112 is properly loaded. However, when the work holder 112 is without a contact leaf spring the arm 171 is engaged by the roller 107 and is pivoted inwardly. This arm 171 is connected through a shaft 172 to an arm 173 which is pivoted to strike and operate a switch 174 (Fig. 5). Operation of the switch 174 energizes a solenoid 175 (Fig. 6) through a suitable circuit (not shown) and upon energization of this solenoid an armature 176 pivotally mounted on the welding machine housing 32 is attracted thereto. The armature 176 is pivotally linked to a rod 177 which passes through an aperture in a housing 32 to pivotally connect with a stop lever 178 (Figs. 1 and 6) which is pivotally connected to the housing 32. Hence, energization of the solenoid 175 moves the stop lever 178 about its pivot into the downward path of the upper welding electrode operating lever 39 to prevent the upper electrode from moving into engagement with the contact element to be welded to the contact leaf spring. Thus when an attempt is made to energize the welding circuit, the air gap between the upper and lower electrodes is sufficient to prevent the current from flowing through the welding circuit.

In the situation where the feeding apparatus is set up for the production of parallel welded contacts, the cam 109 is moved in a counterclockwise direction approximately 30° to bring an arm 180 pivoted in a recess in the underside of the cam 109 into a position beneath a work holder 112 when the work holder is in the welding position (Fig. 16). This arm 180 is similar to arm 171 and is adapted to be pivoted by a roller 107 when the holding arm 111 passes between the work rests 119 in the case where there is no contact leaf spring positioned on the work rests 119. The arm 180 is connected to an arm 181 through a shaft 182 so that when the arm 180 is pivoted the arm 181 is also pivoted to close a switch 183. The switch 183 is electrically connected in parallel with the switch 174 and the closing of either switch completes the circuit (not shown) to energize the solenoid 175. As heretofore described in conjunction with the operation of the safety device 170 when the feeding apparatus was set up for the production of crosswise welded contacts the energization of the solenoid 175 moves the stop lever 178 into the path of the downward movement of the upper welding electrode operating lever to prevent the completion of the welding circuit whenever a work holder is in the welding position without a contact leaf spring.

In the design of electrical apparatus many contactors are required having two contact elements welded to the contact leaf springs 25. In Figs. 20 and 21, two such contacts are shown, viz; a double parallel welded contact (Fig. 20) and a double crosswise welded contact (Fig. 21). In order to change the feeding apparatus 37 from the production of single crosswise welded contacts to double crosswise welded contacts, the pin 93 is removed and the feeding apparatus is in condition to feed the contact leaf springs 25 to produce double crosswise welded contacts. When the pin 93 is removed, the slide 87 and the gear wheel 82 are no longer retained in fixed relation with the hub 89. The slide 87 and the gear wheel 82 are now positioned by a bell crank 200 (Fig. 7) pivoted on a pin 201 which passes through suitable apertures in a hub 89. The upper arm of the bell crank 200 is forked to form two sections 202 and 203 (Fig. 8) on either side of the shaft 85 and these sections are bifurcated at their upper ends to form two slots that slidably engage a pair of pins 204 secured to the slide 87. Rotatably secured to the end of the lower arm of the bell crank 200 is a roller 205 which is forced to follow the periphery contour of the barrel cam 80 by the action of the slide spring 98 tending to force the slide 87 to move towards the left as viewed in Figs. 2 and 7.

In the present embodiment of the invention the barrel cam has four lobes 206 and four troughs 207 and when the roller 205 rides upon one of the lobes 206, the slide 87 is retained in its retracted position by the bell crank 200 as shown in Fig. 2. While the slide 87 is held in the retracted position, the nest plate 100 is driven by the pawl and ratchet mechanism through the internal teeth 81 of the barrel cam 80 and the gear wheel 82 as previously described in the feeding of contact leaf springs to produce single crosswise welded contacts. However, when the roller 205 rides in a trough 207 of the barrel cam 80, the slide 87 and, hence, the gear wheel 82 are shifted to the left (Fig. 2) to disengage the teeth of the gear wheel 82 from the internal teeth 81 of the barrel cam 80. Thus the subsequent movement of the barrel cam 80 by the pawl and ratchet mechanism, while the roller is in the trough 207, is not transmitted to the gear wheel 82 and, hence, the nest plate 100 is not rotated.

In the present embodiment of the invention, the barrel cam 80 is advanced one-eighth of a revolution upon each actuation of the pawl and ratchet mechanism, and since there are four lobes 206 and four troughs 207, the roller 205 moves from a lobe 206 into a trough 207 or vice versa with each actuation of the pawl and ratchet mechanism. The barrel cam 80 is secured to the flanged shaft 55 in such a manner that the change in position of the roller 205 from a lobe 206 to a trough 207 or from a trough to a lobe occurs at the beginning of each actuation of the pawl and ratchet mechanism. Assuming that the roller 205 is positioned in a trough 207, upon the next operation of the pawl and ratchet mechanism, the roller 205 is moved onto a lobe 206 and the slide 87 is retracted to bring the gear wheel 82 into engagement with the internal teeth 81 so that continued movement of the pawl and ratchet mechanism, advances the nest plate 100 one-eighth of a revolution to bring a new contact leaf spring 25 into welding position. A subsequent operation of the pawl and ratchet mechanism causes the roller 205 to move into a trough 207 and as a result the slide 87 is shifted to disengage the gear wheel 82 from the internal teeth 81 of the barrel cam 80 to prevent further feeding of the nest plate 100. Since the nest plate 100 is connected to the slide 87, it, too, is shifted and as a result a second portion of the contact leaf spring is advanced into the welding position whereby a second contact element is welded to the contact leaf spring to produce a double welded crosswise contact. During both welding operations the notched sleeve 141 engages the same locator bar 140. This is possible as the locator bar 140 is set with its longitudinal axis parallel with the direction in which the slide 87 shifts and hence translatory movement of the nest plate 100 does not move the longitudinal axis of the locator bar 140 out of alignment with the notch in the sleeve 141.

In order to produce a double parallel welded contact (Fig. 20) the nest plate 100 is removed and replaced by the nest plate 150 and the pin 93 is also removed. The screws 151 are removed and the cam 109 is rotated approximately 60° to bring the tapped holes 154 into alignment with the apertures 152 in slide 87. The screws 151 are then replaced to secure the cam 109 in the new position. In addition, the bolts 91 for retaining the holding ring 90 against the hub 89 are loosened and hub 89 together with the slide 87, shaft 85, gear wheel 82, and nest plate 150 are rotated 90°. The bolts 91 are retightened and the feeding apparatus is now in condition to feed contact leaf springs to produce double parallel welded contacts. With the feeding apparatus thus set, movement of the roller 205 from a position on a lobe 206 to a position in a trough 207 shifts the nest plate 150 in a translatory motion in a direction transverse to the direction of the longitudinal axis of the contact element. Upon completion of the translatory shift of the nest plate 150, a second contact element is welded to the contact leaf spring 25 to form a contact wherein the longitudinal axes of the contact elements are parallel to each other. Upon the next operation of the pawl and ratchet mechanism, the roller 205 is again raised by a lobe 206 of the barrel cam 80 so that the gear wheel 82 is forced into engagement with the internal teeth 81 of the barrel cam whereupon continued movement of the barrel cam 80 is transmitted to the nest plate 150 to index it one-eighth of a revolution to bring a new contact leaf spring 25 into the welding position.

The forked arms 202 and 203 of the bell crank 200 have secured thereto a cross member 220 (Figs. 2 and 7) which spans the gap between the forked arms. A screw 221 having a knurled knob 222 passes through a threaded aperture in the hub 89 to engage a fabric insert 223 located in a recess in the upper portion of the cross member 220 when the roller 205 is positioned to ride in a trough 207 of the barrel cam 80. This screw 221 has a lock nut 224 threaded thereon for the purpose of locking the screw 221 in various preselected positions. By adjusting this screw 221 the pivoted movement of the bell crank 200 may be regulated since the screw 221 engages the fabric insert 223 when the roller 205 is positioned within a trough 207. The fabric insert 223 is provided for the dual purpose of reducing the shock and noise of the screw 221 engaging the cross member 220. Thus the adjusting screw 221 provides a means whereby the extent of movement of the slide 87 may be varied since the movement of the slide 87 is dependent upon the pivoted movement of the bell crank 200. Inasmuch as the spacing of the contact elements on the contact leaf springs 25 is determined by the amount that the slide 87 is shifted, adjusting the screw 221 results in an adjustment of the spacing of the contact elements in both the production of double crosswise welded contacts and double parallel weld contacts.

A second adjusting screw 225 is provided and passes through a second threaded aperture in the hub 89 to engage the collar 92 of the slide 87. This second screw 225 is provided for the purpose of securing minute adjustments of position of the slide 87 and to insure the contact of the roller 205 with the lobes 206 of the barrel cam 80. Also the adjusting screw 225 provides a means whereby the clearance between the teeth of the gear wheel 82 and the internal teeth 81 of the barrel cam 80 may be regulated. A locking nut 226 is threaded on the screw 225 for the purpose of locking the screw in a selected position.

The feeding apparatus may be set up to produce contacts wherein the longitudinal axis of the contact element can be set at any predetermined angle to the longitudinal axis of the contact leaf spring. This may be accomplished by slightly modifying the work holders to hold the contact leaf spring at the desired angle with respect to the direction of the feed of the contact element and by shifting the hub 89 through the predetermined angle so that the work holder will be held during the welding operation in a position whereby the contact leaf spring is positioned between the welding electrodes. The locator bars secured to the nest plate would be set so that the longitudinal axis of each locator bar would be parallel to the slide 87 as each locator bar is positioned to be engaged by the notched sleeve 141. The notched sleeve 141 would have to be rotated so that one of the tapered notches would be in alignment with one of the locator bars when a work holder would be in the welding position. All that would be necessary to convert the feeding apparatus from the production of single welded contacts to the production of double welded contacts with the angle of the contact element at the predetermined angle would be the removal of pin 93.

In operation of the apparatus for the production of all types of welded contacts the motor 38 is first energized so as to drive the main cam shaft 33. A single rotation of the main cam shaft 33 operates the feeding mechanism 44, cutting mechanism 45 and delivery mechanism 46 to feed a contact element 26 between the welding electrodes 35 and 40 and with each subsequent rotation of the cam shaft 33, another contact element is positioned between the electrodes 35 and 40. With each rotation of the cam shaft 33 the feeding mechanism 37 is actuated to feed a contact leaf spring 25 to the welding position in a manner to be determined by the particular type of welded contact to be produced. In addition with each rotation of the cam shaft 33, the upper and lower electrodes are moved toward each other to engage therebetween a contact element and a predetermined portion of the contact leaf spring 25 to weld the same together.

In order to produce single crosswise welded contacts the feeding apparatus is provided with the nest plate 100 and the removable pin 93 is inserted in the hub 89. Also the hub 89 is arranged relative to the bench so that the slide 87 is positioned with its longitudinal axis parallel to the direction of the feed of the strip of contact material 47. With the feeding apparatus so set, a contact leaf spring 25 is placed in the right hand work holder 112 (Figs. 1, 2 and 17) so as to rest upon the work supports 119 with its longitudinal axis parallel to the groove 123 in nest slide 113 in the manner shown in Fig. 17. Rotation of cam 36 actuates the pawl and ratchet mechanism to cause the barrel cam 80 to rotate one-eighth of a revolution. Since the gear wheel 82 is retained in contact with the internal teeth 81 by the removable pin 93, rotation of the barrel cam 80 is transmitted through the shaft 85 to the nest plate 100 to index the work holder 112 toward the welding electrodes 35 and 40 through a distance of one-eighth of a revolution of the nest plate 100 and with each subsequent operation of the pawl and ratchet mechanism the nest plate 100 is indexed one-eighth of a revolution. As the work holder 112 is advanced to the welding position, the lever 106 pivots inwardly due to the change in the contour of the cam 109 and the holding arm 111 moves into engagement with the contact leaf spring 25 to hold the same against the work supports 119. When the work holder 112 positions a contact leaf spring 25 between the welding electrodes, a contact element 26 is fed thereon, and the welding electrodes are brought into engagement with the contact element and the contact leaf spring 25 to weld them together.

In order to condition the feeding apparatus for the production of double crosswise welded contacts, the pin 93 is removed and thus the roller 205 is permitted to follow the contour of the barrel cam 80. Contact leaf springs are then placed in the work holders with their longitudinal axis parallel to the grooves 123 in the nest slides 113. With the feeding apparatus so adjusted, the nest plate 101 is only rotated one-eighth of a revolution for every other actuation of the pawl and ratchet mechanism; that is, the roller 205 rides upon a lobe 206 of the barrel cam 80 so as to position the gear wheel 82 in engagement with the internal teeth 81 of the barrel cam 80. Upon alternate actuations of the pawl and ratchet mechanism, the roller 205 rides within a trough 207 of the barrel cam 80 and as a result the gear wheel 82 is disengaged from the internal teeth 81 and the nest plate 100 is shifted towards the welding apparatus. Hence, with each rotative movement of the nest plate 100, a new contact leaf spring 25 is presented to the welding machine and a contact element is welded thereto and upon each subsequent shifting of the nest plate 100, a second contact element is welded to the same contact leaf spring.

In producing single parallel welded contacts (Fig. 18), the nest plate 100 is removed and replaced by the nest plate 150, the holding bolts 91 are loosened and the hub 89 together with the slide 87 is rotated 90° and then the holding bolts are retightened to secure the hub 89 in the new position. Contact leaf springs are then placed on the work supports 119 with their longitudinal axes parallel to the grooves 123 in the nest slides 113 and with their shanks overhanging the work holders 112 in the manner illustrated in Fig. 16. The removable pin 93 is positioned within the hub 89 and the gear wheel 82 is maintained in contact with the internal teeth 81 so that upon each actuation of the pawl and ratchet mechanism the nest plate 150 is advanced one-eighth of a revolution to bring another contact leaf spring 25 into welding position.

Upon removal of the pin 93, the feeding apparatus is converted from the production of single parallel welded contacts to the production of double parallel welded contacts. The feeding apparatus now advances contact leaf springs 25 to the welding position only when the roller 205 rides upon a lobe 206 of the barrel cam 80. When the roller 205 rides within a trough 207 of the barrel cam 80 the nest plate 150 together with the contact leaf spring 25 is shifted transversely of the direction of feed of the contact element (Fig. 16) to present a second portion of the contact leaf spring 25 to the welding electrodes. Thus a contact element is welded to the contact leaf spring with its longitudinal axis parallel to the axis of the contact leaf spring upon completion of each index of the nest plate 150 and a second contact element is welded to the same contact leaf spring parallel to the first upon completion of each shift of the nest plate 150.

The locking mechanism 130 is actuated each time a welding operation is performed to hold either the nest plate 100 or 150 stationary during the welding operation. As the operation of the locking mechanism 130 is dependent upon the movement of the lower electrode operating lever 42 (Figs. 1 and 3) the nest plate 100 or 150 is locked during the welding of all types of contacts.

In all types of welding operations the safety device 170 is operative to interrupt the downward movement of the upper welding electrode whenever a work holder 112 arrives at the welding position without a contact leaf spring. Inasmuch as the cam 109 and the work holder 112 are shifted with each shifting of the nest plate 100 or 150, the safety device is actuated in both positions to prevent the completion of the welding circuit.

After the welding operations have been completed to form a contact, the nest plate 100 or 150 is indexed to carry the completed contact to a discharge station (Figs. 16 and 17) whereupon the lever 106 is pivoted outwardly by the cam 109 to release the holding arm 111 from engagement with the completed contact. There is located at the discharge station an air blast mechanism (not shown) which is actuated upon arrival of a work holder 112 at the discharge station to remove a completed contact therefrom.

The feeding apparatus of this invention has been described in conjunction with a welding machine, however, many other types of processing machines such as drill presses, riveting machines, punches, cutters of various sorts, etc., could just as well be used to synchronously operate with this feeding apparatus.

It is to be understood that the above described arrangements are simply illustrative of the invention. Numerous other modifications may be readily devised by those skilled in the art which will embody the principles of the invention and fall within the spirit and scope thereof.

What is claimed is:

1. In an article feeding apparatus, a turntable having a plurality of article holders mounted thereon, means for rotatably indexing the turntable to a predetermined point, a clutch interposed between the indexing means and the turntable, and means controlled by the indexing means to disconnect the clutch at said point and to reciprocate the turntable radially with respect to said predetermined point.

2. In an article feeding apparatus, a turntable having a plurality of article holding means, each comprising a work support block and a pivoted clamp, said block and clamp cooperating to hold the article to be worked upon, means to index the turntable, means to successively move the clamps into engagement with the articles placed on the work support block as the turntable is indexed, means to adjust the position of the work support blocks in a plurality of directions with respect to the turntable and the pivoted clamp, and selective means operatively connected to and controlled by the indexing means for shifting the turntable and article holding means after the turntable has been placed in an indexed position.

3. In an article feeding apparatus, a base, a hub fixed to the base, a slide mounted on the hub, a turntable mounted in the slide, a plurality of article holders secured to the turntable, a pawl and ratchet mechanism connected to the turntable, means to actuate the pawl and the ratchet mechanism to rotate the turntable to carry each article holder to a predetermined position, a cam mounted in the hub and rotated by the pawl and ratchet mechanism, and a pivoted lever mounted in the hub and moved by the cam to shift the slide and place the said article holder in another predetermined position.

4. In an apparatus for feeding articles to an automatic processing machine, a turntable having a plurality of article holders mounted thereon, each of said article holders comprising an article support and a pivoted clamp, a motor for operating the processing machine, an indexing mechanism operated by said motor for advancing the turntable in a step by step movement to successively position articles within the processing machine, a cam inside the periphery of the turntable for successively pivoting the clamps as the turntable is advanced to grip articles placed on the article supports, means actuated by the operation of the processing machine to hold the turntable stationary after an article is indexed into position to be worked upon by the processing machine, and selective means actuated by the indexing mechanism for shifting the turntable while an article is positioned within the processing machine for the purpose of presenting a second portion of the article to be worked upon by the processing machine.

5. An article handling machine, comprising a mechanism to work upon an article, a base, an article carrier mounted on the base, a plurality of article holders mounted on the carrier each having a fixed support and a pivoted clamp for holding an article positioned therebetween, means to index the carrier to successively bring articles placed in the work holders into a predetermined position to be worked upon, means secured to the base for pivoting the clamps to engage the articles as the article holders are indexed to the predetermined position, and means to prevent the operation of the work mechanism when an article holder arrives in the predetermined position without an article.

6. In an automatic machine having a member to work upon an article, a housing, a turntable mounted on the housing and having a plurality of work supports, a plurality of clamps pivoted in the turntable, each of which cooperates with a single work support to grip an article, means to index the turntable to carry articles into a position to be worked upon by said member, means to pivot the work clamps into engagement with the articles as the turntable is indexed, means to move said member when an article is in the position to be worked upon, a stop lever pivotally connected to the housing, and means controlled by the position of the pivoted clamps to pivot the stop lever into the path of movement of said member to interrupt the movement of the member when a work support arrives at the work position without an article.

7. In an article feeding apparatus for a processing machine, a housing, a turntable mounted on the housing, said turntable being provided with a plurality of work holders, a mechanism for imparting to said turntable a step by step rotative movement to carry the work holders successively into different positions including a loading position and a working position, said mechanism comprising indexing means rotatably mounted within the housing, a barrel cam, said barrel cam being provided with internal teeth, a gear wheel slidably mounted within the barrel cam to engage the internal teeth, said gear wheel being connected with the turntable to impart rotative movement from the indexing means to the turntable, and means controlled by the barrel cam to prevent rotative movement of the turntable and to impart a translatory motion to the turntable to shift the work holder from the first working position into the second work position.

8. In an article feeding apparatus for an automatic processing machine, a housing, a turntable mounted on the housing, said turntable having mounted thereon a plurality of article holders each adapted to carry an article to be worked upon by the processing machine, an indexing mechanism mounted on the housing, means to actuate the indexing mechanism to rotate the turntable to carry articles successively to a first work position, means to operate the processing machine to perform a first work operation while an article is in the first work position, a gear connected to the indexing mechanism, a second gear connected to the turntable and in engagement with the first gear, a cam rotatably mounted within the housing and connected to the indexing mechanism, a lever pivotally mounted in the housing and adapted to follow the said cam, said lever being connected to the second gear and to the turntable, whereby alternate actuations of the indexing mechanism rotates the cam to pivot the lever to disengage the gears and impart a translatory motion to the turntable to shift the article into a second work position wherein a second work operation is performed upon the article by the processing machine.

9. In an article feeding apparatus, a housing, a turntable mounted on the housing, a plurality of article holders mounted on the turntable, means for rotatably indexing the turntable to carry each article holder to a predetermined point, means to impart a translatory movement to the turntable after each article holder arrives at the said predetermined point, said translatory imparting means comprising a barrel cam mounted in the housing and driven by the indexing means, a member pivoted to the housing and having mounted at one end a roller and being slidably connected to the turntable at the other end, said roller adapted to follow the contour of the barrel cam to pivot the member to shift the turntable, and a stop to engage the pivoted member to limit the movement thereof, and means to reduce the shock and noise of the member engaging the limiting means.

10. In an article feeding apparatus, a turntable, a plurality of article holders mounted on said turntable, means for indexing said turntable about a circular path in a predetermined plane of movement to a predetermined processing position, and means actuated by the indexing means to impart a translatory movement in the predetermined plane of movement to the turntable, said translatory movement being in a direction different to the circular path of the turntable in reaching the processing position.

11. In an article feeding apparatus, an article carrier, means to index the article carrier along a predetermined path in a predetermined plane to a first position, and means actuated by the indexing means for translating the article carrier in the said predetermined plane transversely of the predetermined path to a second position.

12. In a work feeding apparatus, a work carrier, means for rotatably indexing the work carrier in a predetermined plane of motion to a first position, means controlled by the indexing means for translating the work carrier in the predetermined plane of motion to a second position, and means for rendering said translating means ineffective.

13. A feeding apparatus having an article carrier, means for rotatably indexing the article carrier in a predetermined plane of movement to a first position, means to translate the article carrier in the predetermined plane of movement to a second position, means to control the direction of the said translatory movement, and limiting means to control the degree of said movement and to lock the article carrier in said second position.

14. In an apparatus for feeding articles to a processing machine for performing work on the articles in a plurality of work positions, a turntable having a plurality of article holders mounted thereon, means to index the turntable to successively transport articles secured by the holders along a predetermined path in a predetermined plane to a first work position, and means controlled by the indexing means to shift the turntable to a second work position operative upon completion of a first work operation performed at the first work position.

15. In an article handling apparatus for a processing machine, means for operating the processing machine, a mechanism for securing an article in position to be worked upon by the processing machine, which mechanism comprises a turntable having a plurality of article holders for securing articles placed therein, an indexing device actuated by the operating means to advance the turntable in a step by step movement into a predetermined position so that an article is positioned to be worked upon by the processing machine, means to transmit the movement of the indexing device to shift the turntable in said predetermined position to a second work position on the same article, and means for selectively rendering the said shifting means ineffective.

16. In an article handling apparatus for a processing machine, means for operating the processing machine to perform work on an article, a mechanism for securing and feeding an article into position to be worked upon including a member to be indexed step by step, an interchangeable plate removably attached to the member, a plurality of article holders detachably secured on the said plate, means for adjusting the work holders on the plate for different articles, indexing means actuated by the said operating means to advance the member and the plate in a step by step movement into a predetermined position so that an article held on the plate is worked upon by the processing machine, a bearing plate having pairs of projections and secured to said interchangeable plate for positively locating the interchangeable plate and an article thereon at the said predetermined work position, a pivoted lever cooperating with a pair of said projections for clamping an article on one of the said holders, a slide connected to and rotatable with the interchangeable plate, and cam means secured to the slide and moved by the indexing means for actuating the pivoted lever to clamp the article at said work position.

ROLF A. F. SANDBERG.
FRANK G. WIKSTROM.

References Cited in the file of this patent
UNITED STATES PATENTS

| Number | Name | Date |
|---|---|---|
| 571,434 | Fergusson | Nov. 17, 1896 |
| 1,041,203 | Vahle | Oct. 15, 1912 |
| 1,463,505 | Fretter | July 31, 1923 |
| 1,685,542 | Kail | Sept. 25, 1928 |
| 1,703,986 | Brown | Mar. 5, 1929 |
| 2,069,386 | Palucki | Feb. 2, 1937 |
| 2,222,605 | Carlson | Nov. 26, 1940 |
| 2,353,480 | Marsilius | July 11, 1944 |
| 2,417,472 | Dorff | Mar. 18, 1947 |
| 2,468,255 | Dunn | Apr. 26, 1949 |